(12) United States Patent
Oda

(10) Patent No.: US 9,135,525 B2
(45) Date of Patent: Sep. 15, 2015

(54) CHARACTER RECOGNITION APPARATUS, CHARACTER RECOGNITION METHOD, AND COMPUTER-READABLE MEDIUM

(71) Applicant: FUJI XEROX CO., LTD., Minato-ku, Tokyo (JP)

(72) Inventor: Hideto Oda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 196 days.

(21) Appl. No.: 13/896,679

(22) Filed: May 17, 2013

(65) Prior Publication Data

US 2014/0093161 A1 Apr. 3, 2014

(30) Foreign Application Priority Data

Oct. 1, 2012 (JP) ................................. 2012-219462

(51) Int. Cl.
G06K 9/62 (2006.01)
(52) U.S. Cl.
CPC .............. *G06K 9/6256* (2013.01); *G06K 9/629* (2013.01); *G06K 9/6262* (2013.01); *G06K 2209/01* (2013.01)
(58) Field of Classification Search
None
See application file for complete search history.

(56) References Cited

U.S. PATENT DOCUMENTS

| | | | | |
|---|---|---|---|---|
| 5,832,108 A * | 11/1998 | Fukita et al. | ............... | 382/159 |
| 5,835,633 A * | 11/1998 | Fujisaki et al. | ............... | 382/187 |
| 7,031,530 B2 * | 4/2006 | Driggs et al. | ............... | 382/228 |
| 8,548,256 B2 * | 10/2013 | Loui et al. | ............... | 382/218 |
| 8,755,594 B2 * | 6/2014 | Yokono et al. | ............... | 382/159 |
| 2003/0059115 A1 * | 3/2003 | Nakagawa | ............... | 382/197 |
| 2004/0146200 A1 * | 7/2004 | Andel et al. | ............... | 382/177 |
| 2005/0100214 A1 * | 5/2005 | Zhang et al. | ............... | 382/179 |
| 2005/0100217 A1 * | 5/2005 | Abdulkader et al. | ............... | 382/186 |
| 2006/0274943 A1 * | 12/2006 | Abdulkader et al. | ............... | 382/186 |
| 2007/0005537 A1 * | 1/2007 | Abdulkader et al. | ............... | 706/20 |
| 2007/0280536 A1 * | 12/2007 | Zhang et al. | ............... | 382/187 |
| 2009/0067730 A1 * | 3/2009 | Schneiderman | ............... | 382/224 |
| 2014/0119641 A1 * | 5/2014 | Oda | ............... | 382/159 |

FOREIGN PATENT DOCUMENTS

| | | |
|---|---|---|
| JP | 08-096082 A | 4/1996 |
| JP | 09-288717 A | 11/1997 |
| JP | 2000-105798 A | 4/2000 |
| JP | 2001-022883 A | 1/2001 |

* cited by examiner

*Primary Examiner* — Chan Park
*Assistant Examiner* — Iman K Kholdebarin
(74) *Attorney, Agent, or Firm* — Sughrue Mion, PLLC

(57) ABSTRACT

A character recognition apparatus includes an evaluation-value output unit, a generation unit, a learning unit, and a determination unit. The evaluation-value output unit outputs evaluation values for each of different character recognition programs. Each evaluation value indicates a degree to which an inputted character pattern corresponds to each of character codes to be recognized using the character recognition program. The generation unit generates feature information for the character pattern. The feature information includes, as elements, the evaluation values. The learning unit learns classifications for feature information on a character-code-by-character-code basis based on feature information generated for a character pattern for which a character code is specified in advance. The determination unit determines a character code of an unknown character pattern whose character code is unknown, based on which classification among the learned classifications includes feature information generated for the unknown character pattern.

4 Claims, 5 Drawing Sheets

CHARACTER RECOGNITION APPARATUS, CHARACTER RECOGNITION METHOD, AND COMPUTER-READABLE MEDIUM

CROSS-REFERENCE TO RELATED APPLICATIONS

This application is based on and claims priority under 35 USC 119 from Japanese Patent Application No. 2012-219462 filed Oct. 1, 2012.

BACKGROUND (i) Technical Field

The present invention relates to a character recognition apparatus, a character recognition method, and a computer-readable medium.

(ii) Related Art

Some character recognition programs are used to recognize a character code of a handwritten character drawn by a person.

SUMMARY

According to an aspect of the present invention, there is provided a character recognition apparatus including an evaluation-value output unit, a generation unit, a learning unit, and a determination unit. The evaluation-value output unit outputs multiple evaluation values for each of character recognition programs which are different from each other. Each of the evaluation values indicates a degree to which a character pattern which has been input corresponds to each of character codes to be recognized using the character recognition program. The generation unit generates feature information for the character pattern which has been input. The feature information includes, as elements, the evaluation values being output by the evaluation-value output unit. The learning unit learns classifications for feature information on a character-code-by-character-code basis on the basis of feature information generated by the generation unit for a character pattern for which a character code is specified in advance. The determination unit determines a character code of an unknown character pattern on the basis of which classification among the learned classifications for feature information on a character-code-by-character-code basis includes feature information generated by the generation unit for the unknown character pattern. The unknown character pattern is a character pattern whose character code is unknown.

BRIEF DESCRIPTION OF THE DRAWINGS

Exemplary embodiment of the present invention will be described in detail based on the following figures, wherein.

DETAILED DESCRIPTION

An exemplary embodiment for carrying out the present invention (hereinafter, referred to as an exemplary embodiment) will be described below with reference to the drawings.

Functional Blocks

Figure 1:
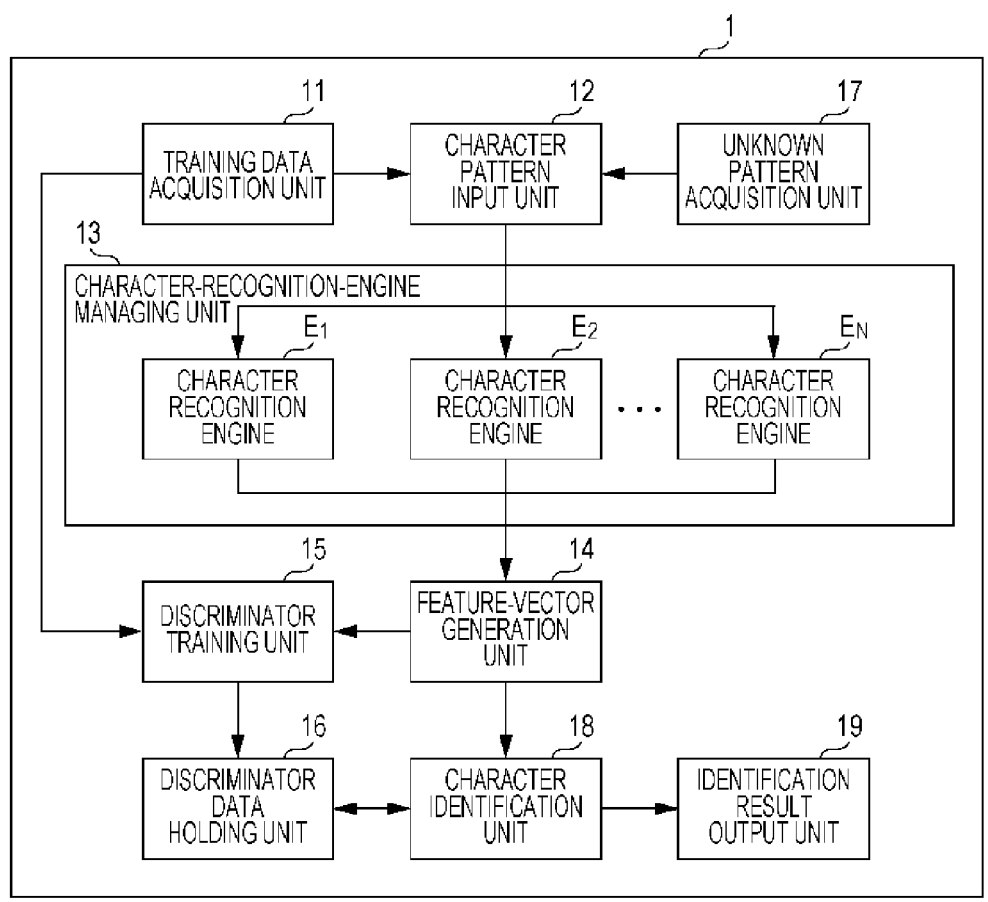
FIG. 1 is a functional block diagram for a character recognition apparatus according to an exemplary embodiment.

FIG. 1 illustrates a functional block diagram for a character recognition apparatus 1 according to the exemplary embodiment. As illustrated in FIG. 1, the character recognition apparatus 1 includes a training data acquisition unit 11, a character pattern input unit 12, a character-recognition-engine managing unit 13, a feature-vector generation unit 14, a discriminator training unit 15, a discriminator data holding unit 16, an unknown pattern acquisition unit 17, a character identification unit 18, and an identification result output unit 19.

Functions of the above-described units included in the character recognition apparatus 1 may be achieved in such a manner that a computer which includes a control unit such as a central processing unit (CPU), a storage unit such as a memory, and an input/output unit which receives/transmits data from/to an external device reads and then executes programs stored in a computer-readable information storage medium. The programs may be supplied to the character recognition apparatus 1 which is a computer via an information storage medium, such as an optical disk, a magnetic disk, a magnetic tape, a magneto-optical disk, or a flash memory. Alternatively, the programs may be supplied via a data communications network such as the Internet.

The training data acquisition unit 11 acquires training data for training a discriminator (identification model) which recognizes a character. For example, when the training data is an offline character pattern, the training data may include information about a character pattern and a character code indicated by the character pattern. When the training data is an online character pattern, the training data may include information about a character pattern, stroke order data (stroke data) of the character pattern, and a character code indicated by the character pattern.

The character pattern input unit 12 inputs character patterns acquired by the training data acquisition unit 11 and the unknown pattern acquisition unit 17 described below into the character-recognition-engine managing unit 13. For an offline character pattern, the character pattern input unit 12 inputs a character pattern (character image) into the character-recognition-engine managing unit 13, whereas, for an online character pattern, the character pattern input unit 12 inputs a character pattern (character image) and its stroke order data into the character-recognition-engine managing unit 13.

The character-recognition-engine managing unit 13 includes multiple character recognition engines, i.e., character recognition programs, and manages input of information to the character recognition engines and output of information from the character recognition engines.

The character-recognition-engine managing unit 13 includes character recognition engines $E_1$ to $E_N$ (where N is an integer equal to or more than 2) which are different from each other. The character recognition engines $E_1$ to $E_N$ may be those for offline character recognition, or may be those for online character recognition. A character recognition engine $E_i$ (where i is any integer from 1 to N) is configured to recognize character codes, the number of which is $M_i$, and generates and then outputs an $M_i$-dimensional evaluation vector $W_i$ whose elements are evaluation values, such as probabilities, similarities, or distances, which correspond to the respective $M_i$ character codes, for a character pattern which has been input from the character pattern input unit 12. The character codes which are to be recognized by a character recognition engine $E_i$ may be different from those which are to be recognized by another character recognition engine. Alternatively, at least some of the character codes which are to be recognized by a character recognition engine $E_i$ may match at least some of the character codes which are to be recognized by another character recognition engine.

The feature-vector generation unit 14 generates a feature vector for the character pattern which has been input by the character pattern input unit 12 into the character-recognition-engine managing unit 13, on the basis of the evaluation vectors, each of which is output from a corresponding one of the character recognition engines $E_1$ to $E_N$ included in the character-recognition-engine managing unit 13 in accordance with the character pattern.

Figure 2:
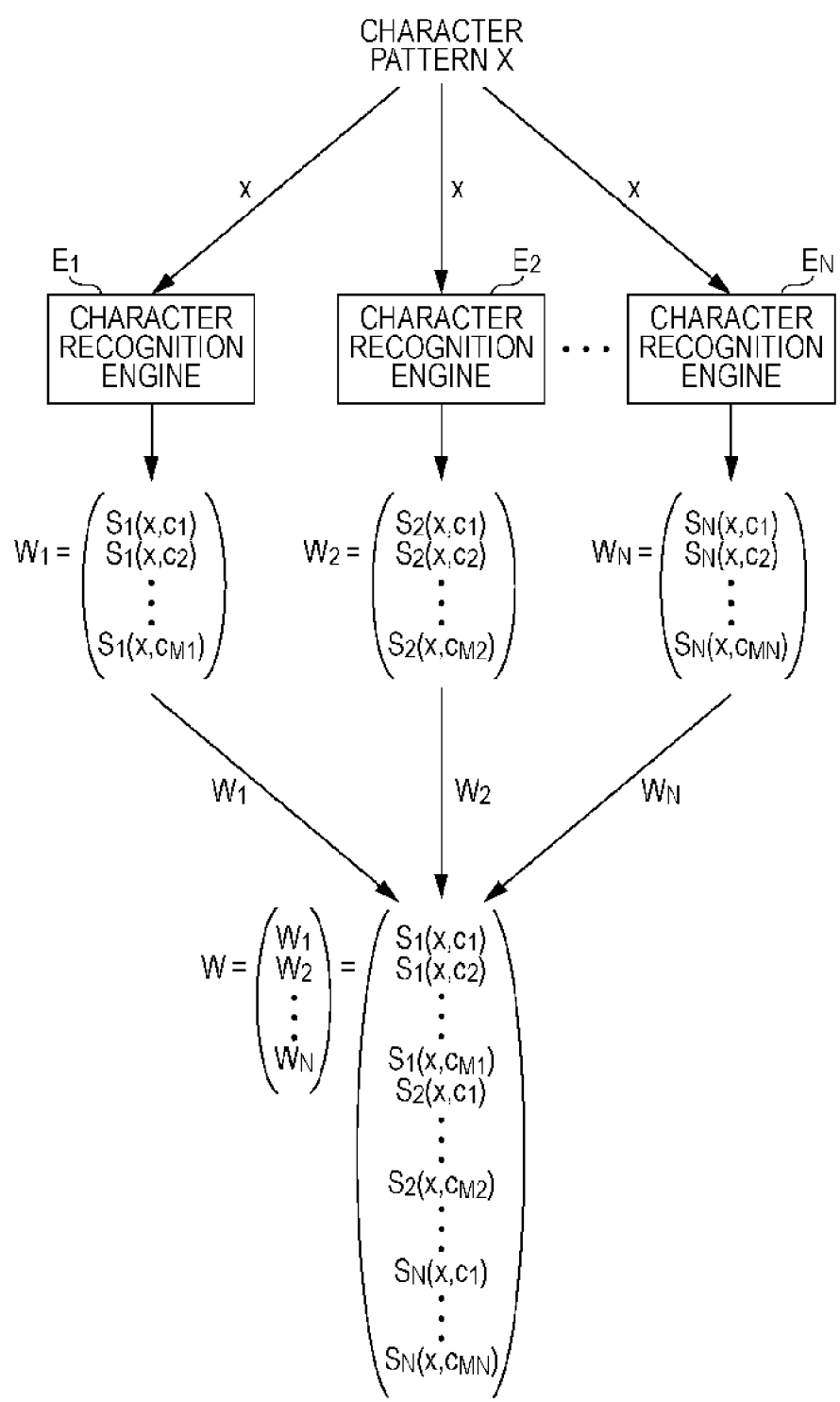
FIG. 2 is a diagram for describing a process of generating a feature vector.

FIG. 2 is a diagram for describing a process of generating a feature vector. As illustrated in FIG. 2, the feature-vector generation unit 14 sequentially connects the evaluation vectors $W_1$ to $W_N$ which are output from the respective character recognition engines $E_1$ to $E_N$ to generate a $(M_1+M_2 \ldots M_N)$-dimensional feature vector W. In FIG. 2, $S_i(x, c_j)$ represents a degree of correctness, such as a probability, a distance, or a similarity, which indicates how probable it is that a character pattern X corresponds to a j-th character code (where j is a number) in a character recognition engine $E_i$.

The discriminator training unit 15 causes a discriminator to learn a character pattern in training data acquired by the training data acquisition unit 11, on the basis of the feature vector generated by the feature-vector generation unit 14 and the character code determined for the character pattern. Specifically, a machine learning model, such as AdaBoost or a support vector machine, may be used as a discriminator. The discriminator training unit 15 may generate parameters for identifying a character code on the basis of feature vector groups on a character-code-by-character-code basis.

The discriminator data holding unit 16 holds parameters generated from the discriminator training unit 15.

The unknown pattern acquisition unit 17 acquires a character pattern to be recognized. For example, the unknown pattern acquisition unit 17 may acquire a handwritten character which is input into an input apparatus, such as a touch panel, connected to the character recognition apparatus 1, as an unknown pattern.

The character pattern input unit 12 inputs the unknown pattern acquired by the unknown pattern acquisition unit 17 into the character-recognition-engine managing unit 13. Then, the character recognition engines $E_1$ to $E_N$ each generate an evaluation vector for the unknown pattern. The feature-vector generation unit 14 generates a feature vector for the unknown pattern on the basis of the evaluation vectors generated by the character recognition engines $E_1$ to $E_N$. The process of generating a feature vector for an unknown pattern is similar to that of generating a feature vector for a character pattern included in training data.

The character identification unit 18 identifies a character code which corresponds to the unknown pattern, on the basis of the feature vector for the unknown pattern which is generated from the feature-vector generation unit 14 and parameters which are held in the discriminator data holding unit 16 and which are obtained through learning of identification of character codes.

The identification result output unit 19 outputs the character code identified by the character identification unit 18. For example, the identification result output unit 19 generates output information for outputting the character code identified by the character identification unit 18, and may output the output information to, for example, a display or a printer which is connected to the character recognition apparatus 1.

Flowcharts

Processes performed in the character recognition apparatus 1 will be described in detail below with reference to the flowcharts in FIGS. 3 to 5.

Learning Process

Figure 3:
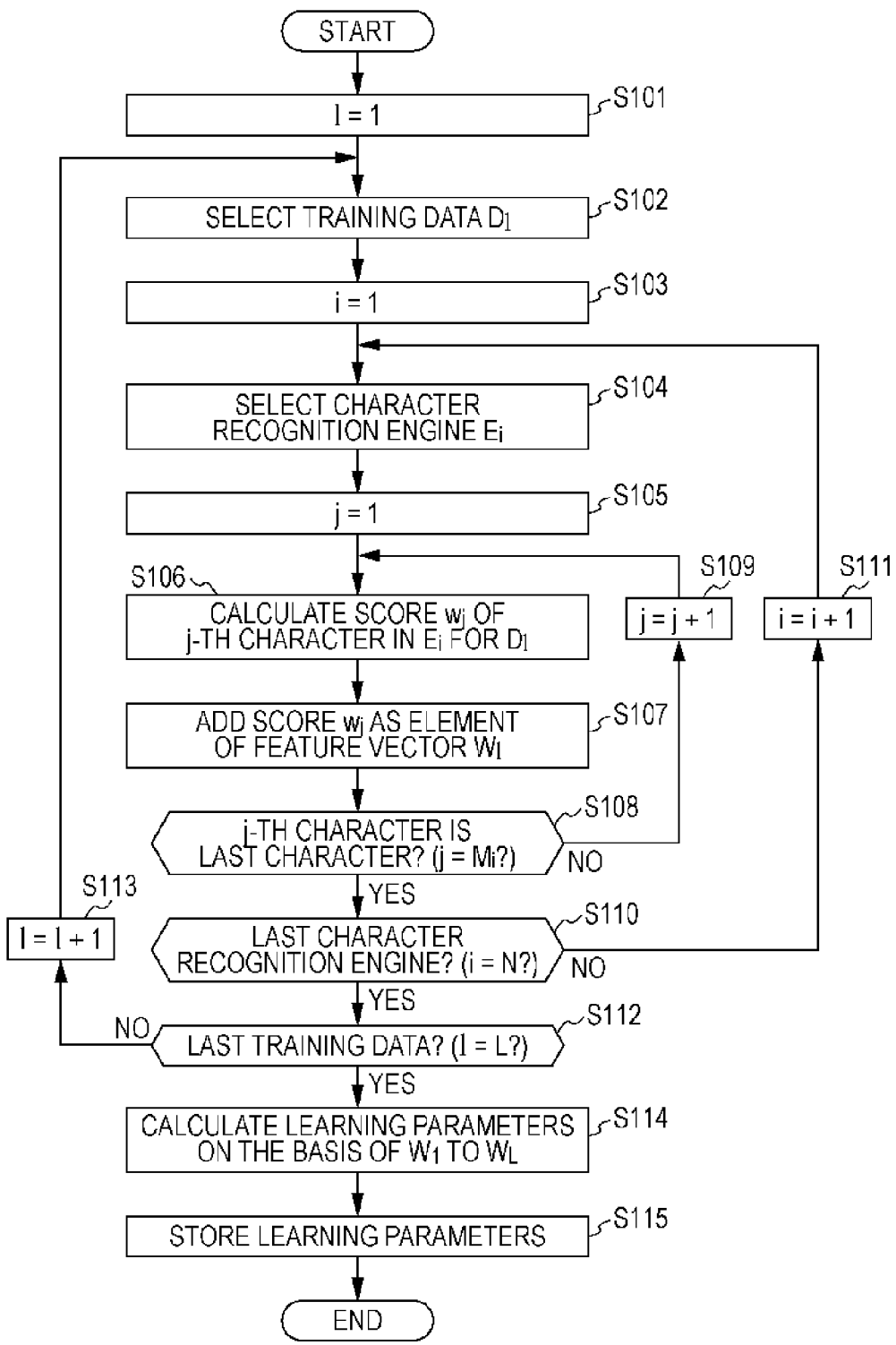
FIG. 3 is a flowchart of a learning process.

FIG. 3 is a flowchart of a learning process performed in the character recognition apparatus 1. A learning process is a process of causing a discriminator to learn identification of character codes on the basis of training data (supervised data).

As illustrated in FIG. 3, the character recognition apparatus 1 sets a variable l (where l is any integer from 1 to L) to 1 as an initial value (in step S101), and selects training data $D_l$ (in step S102).

Then, the character recognition apparatus 1 sets a variable i (where i is any integer from 1 to N) to 1 as an initial value (in step S103), and selects a character recognition engine $E_i$ (in step S104).

Then, the character recognition apparatus 1 sets a variable j (where j is any integer from 1 to $M_i$, and $M_i$ indicates the number of characters which a character recognition engine $E_i$ is capable of identifying) to 1 as an initial value (in step S105), calculates a score $w_j$ indicating how probable it is that the training data $D_l$ corresponds to the j-th character in the character recognition engine $E_i$ (in step S106), and adds the calculated score $w_j$ as an element of a feature vector $W_l$ (in step S107).

If the j-th character is not the last character in the character recognition engine $E_i$, that is, the expression $j=M_i$ is not satisfied (NO in step S108), the character recognition apparatus 1 increments j by 1 (in step S109), and the process returns back to step S106. If the j-th character is the last character in the character recognition engine $E_i$, that is, the expression $j=M_i$ is satisfied (YES in step S108), the character recognition apparatus 1 determines whether or not the variable i reaches N, i.e., whether or not the training data $D_l$ has been processed by the last character recognition engine (in step S110).

If the variable i does not reach N (NO in step S110), the character recognition apparatus 1 increments i by 1 (in step S111), and the process returns back to step S104. If the variable i reaches N (YES in step S110), the character recognition apparatus 1 determines whether or not the variable l reaches L, i.e., whether or not the last training data has been processed (in step S112).

If the variable l does not reach L (NO in step S112), the character recognition apparatus 1 increments l by 1 (in step S113), and the process returns back to step S102. If the variable l reaches L (YES in step S112), the character recognition apparatus 1 calculates learning parameters though learning of identification of a character code in the discriminator, on the basis of the feature vectors $W_1$ to $W_L$ generated for the respective pieces of training data $D_1$ to $D_L$ (in step S114), stores the calculated learning parameters (in step S115), and ends the process.

Character Recognition Process

A process (character recognition process) in which an unknown character pattern is identified and which is performed by the discriminator that has learned identification of character codes will be described below.

Figure 4:
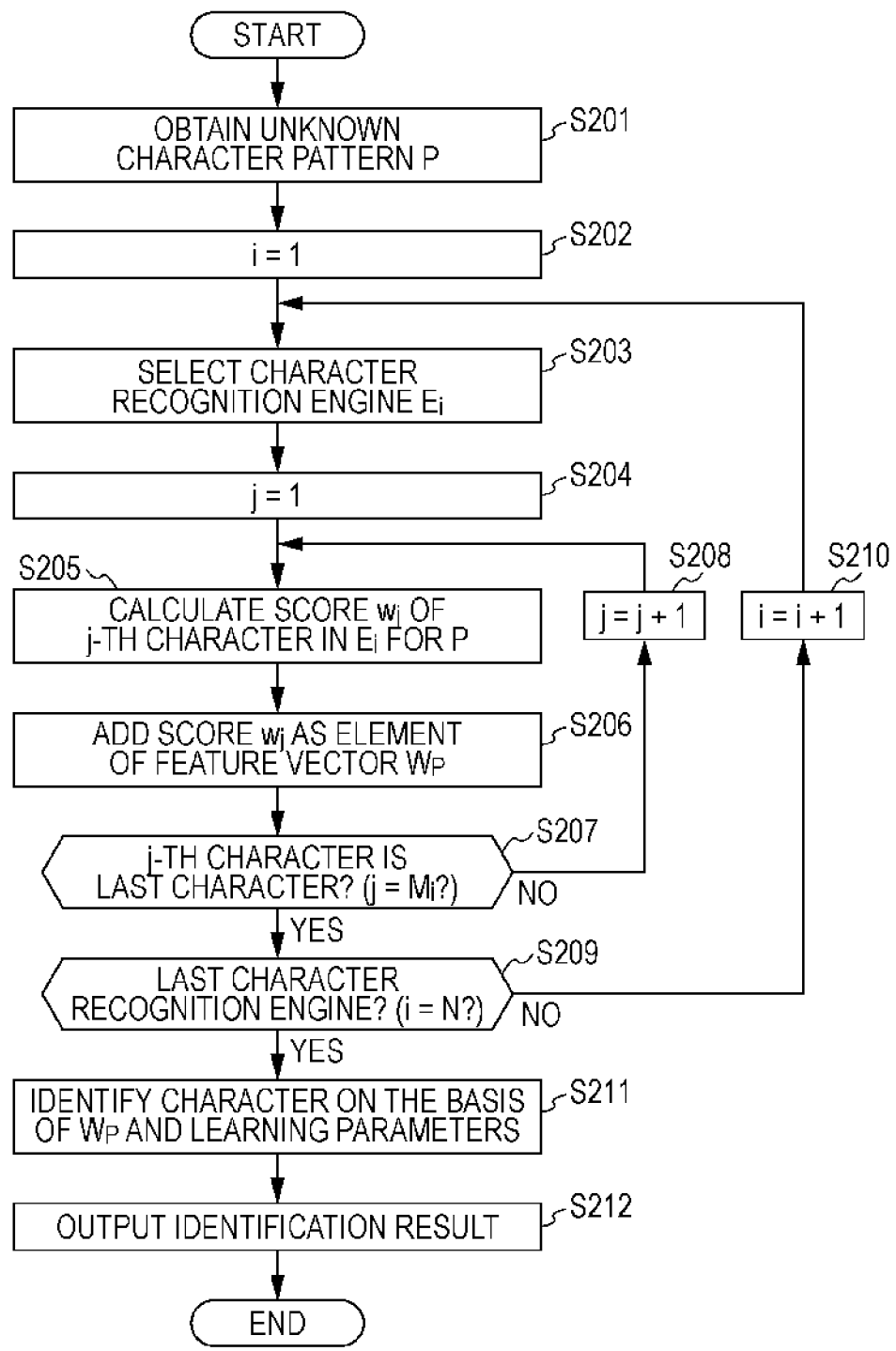
FIG. 4 is a flowchart of a character recognition process.

FIG. 4 is a flowchart of a character recognition process performed in the character recognition apparatus 1. As illustrated in FIG. 4, the character recognition apparatus 1 obtains an unknown character pattern P (in step S201).

Then, the character recognition apparatus 1 sets a variable i (where i is any integer from 1 to N) to 1 as an initial value (in step S202), and selects a character recognition engine $E_i$ (in step S203).

Then, the character recognition apparatus 1 sets a variable j (where j is any integer from 1 to $M_i$, and $M_i$ indicates the number of characters which a character recognition engine $E_i$ is capable of identifying) to 1 as an initial value (in step S204), calculates a score $w_j$ indicating how probable it is that the character pattern P corresponds to the j-th character in the character recognition engine $E_i$ (in step S205), and adds the calculated score $w_j$ as an element of a feature vector $W_P$ (in step S206).

If the j-th character is not the last character in the character recognition engine $E_i$, that is, the expression $j=M_i$ is not satisfied (NO in step S207), the character recognition apparatus 1 increments j by 1 (in step S208), and the process returns back to step S205. If the j-th character is the last character in the character recognition engine $E_i$, that is, the expression $j=M_i$ is satisfied (YES in step S207), the character recognition apparatus 1 determines whether or not the variable i reaches N, i.e., whether or not the character pattern P has been processed by the last character recognition engine (in step S209).

If the variable i does not reach N (NO in step S209), the character recognition apparatus 1 increments i by 1 (in step S210), and the process returns back to step S203. If the variable i reaches N (YES in step S209), the character recognition apparatus 1 identifies a character corresponding to the character pattern P on the basis of the feature vector $W_P$ generated for the unknown character pattern P and the learning parameters which have been obtained through learning performed by the discriminator (in step S211), outputs the identification result (in step S212), and ends the process.

Process of Setting Character Recognition Engine

A process in which a character recognition engine is set and which is performed after the learning process will be described below.

Figure 5:
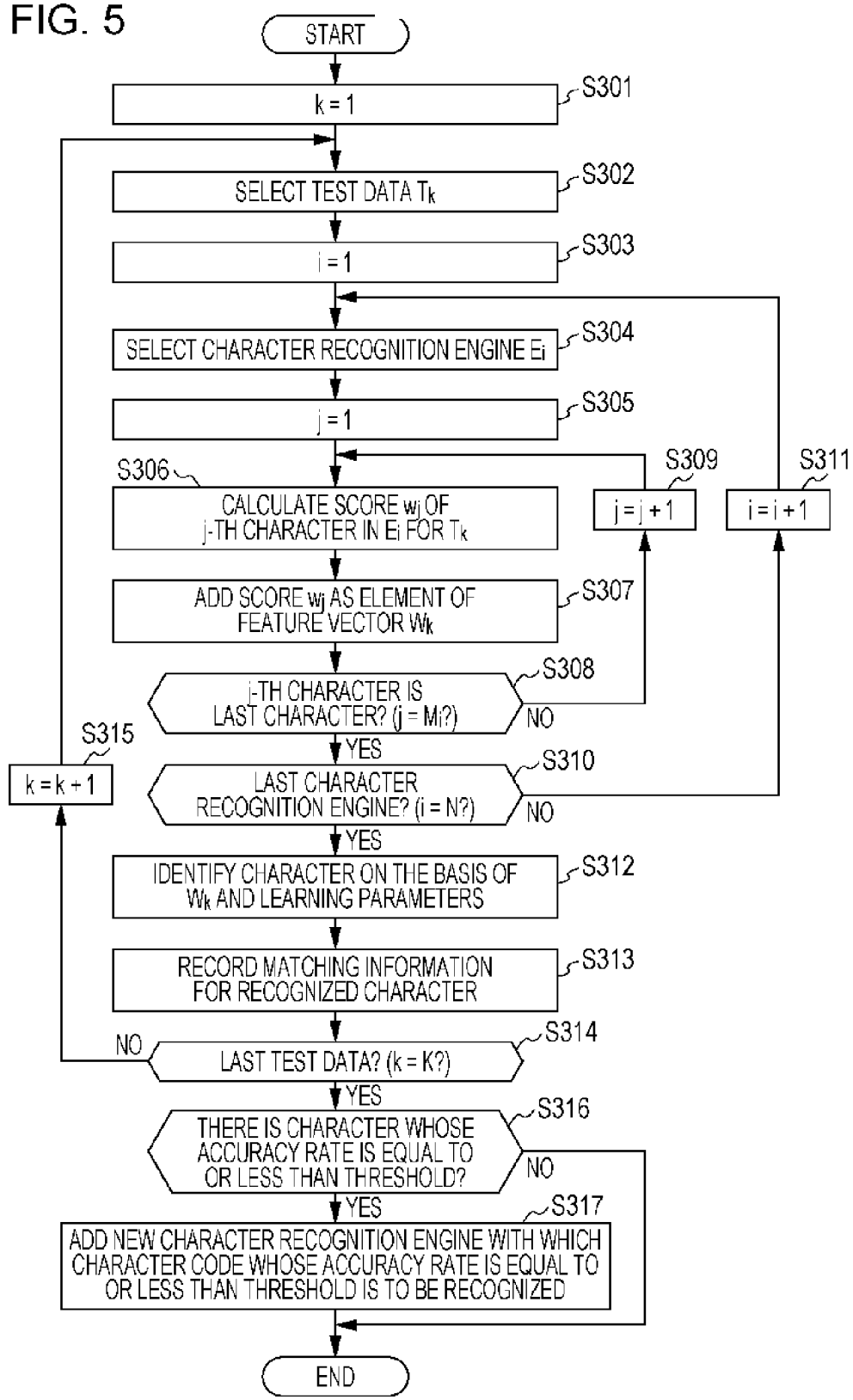
FIG. 5 is a flowchart of a process of setting a character recognition engine.

FIG. 5 is a flowchart of a process of setting a character recognition engine. A process of setting a character recognition engine is a process in which, when the discriminator which has learned identification of character codes has an insufficient identification rate for a character code, a character recognition engine is added to complement identification of the character code whose identification rate is insufficient.

As illustrated in FIG. 5, the character recognition apparatus 1 sets a variable k (where k is any integer from 1 to K) to 1 as an initial value (in step S301), and selects test data $T_k$ (in step S302). Test data may be information including a character pattern and the character code of the character pattern, which is similar to the training data.

Then, the character recognition apparatus 1 sets a variable i (where i is any integer from 1 to N) to 1 as an initial value (in step S303), and selects a character recognition engine $E_i$ (in step S304).

Then, the character recognition apparatus 1 sets a variable j (where j is any integer from 1 to $M_i$, and $M_i$ indicates the number of characters which a character recognition engine $E_i$ is capable of identifying) to 1 as an initial value (in step S305), calculates a score $w_j$ indicating how probable it is that the test data $T_k$ corresponds to the j-th character in the character recognition engine $E_i$ (in step S306), and adds the calculated score $w_j$ as an element of a feature vector $W_k$ (in step S307).

If the j-th character is not the last character in the character recognition engine $E_i$, that is, the expression $j=M_i$ is not satisfied (NO in step S308), the character recognition apparatus 1 increments j by 1 (in step S309), and the process returns back to step S306. If the j-th character is the last character in the character recognition engine $E_i$, that is, the expression $j=M_i$ is satisfied (YES in step S308), the character recognition apparatus 1 determines whether or not the variable i reaches N, i.e., whether or not the test data $T_k$ has been processed by the last character recognition engine (in step S310).

If the variable i does not reach N (NO in step S310), the character recognition apparatus 1 increments i by 1 (in step S311), and the process returns back to step S304. If the variable i reaches N (YES in step S310), the character recognition apparatus 1 identifies a character code corresponding to the character pattern of the test data $T_k$, on the basis of the feature vector $W_k$ calculated for the test data $T_k$ and the learning parameters obtained through learning performed by the discriminator (in step S312). Then, the character recognition apparatus 1 records matching information indicating whether or not the character code identified in step S312 matches the character code determined for the character pattern of the test data $T_k$ (in step S313).

Then, the character recognition apparatus 1 determines whether or not the variable k reaches K, i.e., whether or not the last test data has been processed (in step S314). If the variable k does not reach K (NO in step S314), the character recognition apparatus 1 increments k by 1 (in step S315), and the process returns back to step S302. If the variable k reaches K (YES in step S314), the character recognition apparatus 1 determines whether or not there is a character code whose accuracy rate is equal to or less than a threshold, on the basis of the matching information for each of the character codes recorded in step S313 (in step S316).

If there is not a character code whose accuracy rate is equal to or less than the threshold (NO in step S316), the character recognition apparatus 1 ends the process. If there is a character code whose accuracy rate is equal to or less than the threshold (YES in step S316), the character recognition apparatus 1 adds a new character recognition engine with which the character code whose accuracy rate is equal to or less than the threshold is to be recognized, to the character recognition engines $E_1$ to $E_N$ (in step S317), and ends the process of setting a character recognition engine.

After the process of setting a character recognition engine is completed, the learning process illustrated in FIG. 3 may be performed again. The learning process illustrated in FIG. 3 and the process of setting a character recognition engine, which is illustrated in FIG. 5, may be repeatedly performed until it is determined that there is not a character code whose accuracy rate is equal to or less than the threshold, in step S316 in the flowchart in FIG. 5.

In the character recognition apparatus 1 described above, even when a single character recognition engine recognizes some characters with high accuracy and some with low accuracy, a feature vector obtained by combining character recognition results of multiple character recognition engines is used to identify the character code of a character pattern through utilization of character-code classification results obtained in advance through machine learning. Compared with the case where an output result is obtained from a single character recognition engine or is obtained by comparing the results obtained from individual character recognition engines, the character recognition apparatus 1 achieves character recognition with high accuracy.

The present invention is not limited to the above-described exemplary embodiment. In the flowcharts described above, an offline character pattern is processed. It goes without saying that the present invention may be applied to an online character pattern in a similar manner.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A character recognition apparatus comprising:
at least one processor configured to execute:
an evaluation-value output unit that outputs a plurality of evaluation values for each of a plurality of character recognition programs which are different from each other, each of the plurality of evaluation values indicating a degree to which a character pattern which has been input corresponds to each of a plurality of character codes to be recognized using the character recognition program;
a generation unit that generates feature information for the character pattern which has been input, the feature information including, as elements, the plurality of evaluation values being output by the evaluation-value output unit;
a learning unit that learns classifications for feature information on a character-code-by-character-code basis on the basis of feature information generated by the generation unit for a character pattern for which a character code is specified in advance;
a determination unit that determines a character code of an unknown character pattern on the basis of which classification among the learned classifications for feature information on a character-code-by-character-code basis includes feature information generated by the generation unit for the unknown character pattern, the unknown character pattern being a character pattern whose character code is unknown;
a specifying unit that, for each of a plurality of character patterns for which character codes are specified in advance, compares a character code determined by the determination unit for the character pattern with the character code specified for the character pattern and that specifies a character code whose accuracy rate is equal to or less than a threshold on the basis of a result obtained through the comparison; and
a unit that adds a character recognition program which is to recognize the character code specified by the specifying unit to the evaluation-value output unit.

2. The character recognition apparatus according to claim 1,
wherein the plurality of character recognition programs include a first character recognition program and a second character recognition program, and
wherein at least some of a plurality of character codes to be recognized by the first character recognition program match at least some of a plurality of character codes to be recognized by the second character recognition program.

3. A non-transitory computer readable medium storing a program causing a computer to execute a process for recognizing a character, the process comprising:
outputting, by an evaluation value output unit, a plurality of evaluation values for each of a plurality of character recognition programs which are different from each other, each of the plurality of evaluation values indicating a degree to which a character pattern which has been input corresponds to each of a plurality of character codes to be recognized using the character recognition program;
generating feature information for the character pattern which has been input, the feature information including, as elements, the plurality of evaluation values output by the evaluation-value output unit;
learning classifications for feature information on a character-code-by-character-code basis on the basis of feature information generated for a character pattern for which a character code is specified in advance;
determining a character code of an unknown character pattern on the basis of which classification among the learned classifications for feature information on a character-code-by-character-code basis includes feature information generated for the unknown character pattern, the unknown character pattern being a character pattern whose character code is unknown;
for each of a plurality of character patterns for which character codes are specified in advance, comparing a determined character code for the character pattern with the character code specified for the character pattern and specifying a character code whose accuracy rate is equal to or less than a threshold on the basis of a result obtained through the comparison; and
adding a character recognition program which is to recognize the specified character code to the evaluation-value output unit.

4. A character recognition method comprising:
outputting, by an evaluation-value output unit, a plurality of evaluation values for each of a plurality of character recognition programs which are different from each other, each of the plurality of evaluation values indicating a degree to which a character pattern which has been input corresponds to each of a plurality of character codes to be recognized using the character recognition program;
generating feature information for the character pattern which has been input, the feature information including, as elements, the plurality of evaluation values output by the evaluation-value output unit;
learning classifications for feature information on a character-code-by-character-code basis on the basis of feature information generated for a character pattern for which a character code is specified in advance;
determining a character code of an unknown character pattern on the basis of which classification among the learned classifications for feature information on a character-code-by-character-code basis includes feature information generated for the unknown character pattern, the unknown character pattern being a character pattern whose character code is unknown;
for each of a plurality of character patterns for which character codes are specified in advance, comparing a determined character code for the character pattern with the character code specified for the character pattern d specifying a character code whose accuracy rate is equal to or less than a threshold on the basis of a result obtained through the comparison; and
adding a character recognition program which is to recognize the specified character code to the evaluation-value output.

* * * * *